United States Patent [19]

Hous

[11] 4,104,218

[45] Aug. 1, 1978

[54] STABILIZED HALOBUTYL RUBBER

[75] Inventor: Pierre Hous, Steenokkerzeel, Belgium

[73] Assignee: Exxon Research & Engineering Co., Linden, N.J.

[21] Appl. No.: 752,866

[22] Filed: Dec. 21, 1976

[30] Foreign Application Priority Data

Dec. 30, 1975 [GB] United Kingdom ............... 53133/75

[51] Int. Cl.$^2$ .............................................. C08L 91/00
[52] U.S. Cl. .......................... 260/23.7 H; 260/23.7 B; 260/42.36
[58] Field of Search ..................... 260/23.7 B, 33.2 R, 260/42.36, 23.7 H

[56] References Cited

U.S. PATENT DOCUMENTS

| | | | |
|---|---|---|---|
| 2,985,608 | 5/1961 | Higgins et al. | 260/23.7 B |
| 3,400,090 | 9/1968 | Maslow | 260/23.7 B |
| 3,649,715 | 3/1972 | Oetzel | 260/23.7 B |

Primary Examiner—Lewis T. Jacobs
Attorney, Agent, or Firm—William T. Clarke

[57] ABSTRACT

A stabilized halobutyl rubber composition comprises (1) a halobutyl rubber e.g. chlorobutyl, (2) an alkali metal carboxylate or an alkaline earth metal carboxylate e.g. calcium stearate and (3) an ether, e.g. a polyether.

With this stabilization system during the drying process in the halobutyl plant hydrogen halide evolution is strongly delayed and even if some hydrogen halide is evolved, usually no cross-linking occurs.

12 Claims, No Drawings

STABILIZED HALOBUTYL RUBBER

This invention relates to the stabilisation of halobutyl rubber, in particular chlorobutyl rubber.

One of the main problems of manufacturing chlorobutyl rubber is polymer stabilisation during the drying (finishing) process in the plant. Allylic halogens such as those present in chlorobutyl are very reactive and unstable at high temperatures. Therefore, the chlorobutyl polymer can survive the severe conditions of the plant finishing operation only if a heat stabiliser is added. Due to the short heat exposure times at high temperatures encountered in the plant the chlorobutyl polymer, if not stabilised, would encourage dehydrochlorination; i.e.

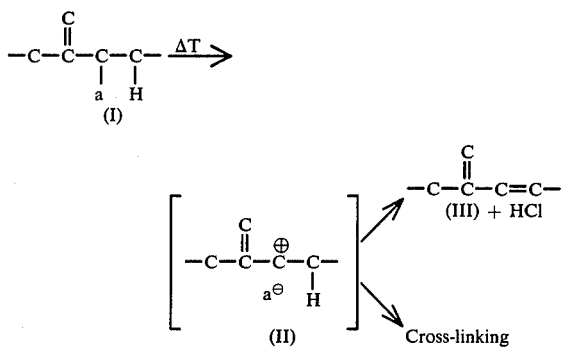

The dehydrochlorination step probably goes via an intermediate charge transfer complex (II) which is the cause of the observed purple coloration. The unstable intermediate (II) can decompose to give a conjugated chain (III), but can also react with a chlorinated isoprene unit of another chlorobutyl chain, resulting in a cross-link. Summarising, heat treatment of unstabilised chlorobutyl results in dehydrochlorination and subsequent cross-linking. This gelled polymer is a useless product and cannot even be reprocessed anymore.

Currently calcium stearate is often used as a heat stabiliser. The latter slows down the dehydrochlorination reaction probably both by complexing the chlorinated isoprene units and scavenging the evolved hydrochloric acid. However, the stabilising power of calcium stearate is limited and despite its presence dehydrochlorination can occur causing serious plant problems. Thus, there is clearly a need for an improved stabilising system in chlorobutyl manufacturing.

We have now found an improved stabilisation system and according to this invention a stabilised halobutyl rubber composition comprises a halobutyl rubber, an alkali metal carboxylate or alkaline earth metal carboxylate and an ether.

The stabilisation system of this invention is advantageous over the use of calcium stearate above in that not only is hydrogen halide evolution strongly delayed, but even wherein after prolonged heat treatment some hydrogen halide is evolved, usually no cross-linking occurs.

Halogenated butyl rubber is derived from butyl rubber. By butyl rubber we mean copolymers made from the polymerisation of reactant mixtures having 70 to 99.5 wt.% of an isoolefin having 4 to 7 carbon atoms per molecule, e.g. isobutylene and 0.5 to 30 wt.% of a conjugated multiolefin having 4 to 14 carbon atoms per molecule, e.g. isoprene, piperylene or cyclopentadiene.

The resulting copolymer contains 85 to 99.8 wt.% of combined isoolefin and 0.2 to 15 wt.% of combined multiolefin. Butyl rubber generally has a viscosity average molecular weight of 20,000 to 500,000, preferably 100,000 to 600,000 and Wijs iodine No. of 0.5 to 50, preferably 1 to 15. Expressed on a molar basis the butyl rubber may have incorporated therein 0.2 to 10 mole % of combined multiolefin, preferably 1 to 4 mole %, e.g. about 2 mole %.

Halogenated butyl rubber can be made by halogenating butyl rubber in a solution containing 1 to 60 wt.% of butyl rubber in a substantially inert $C_5$ to $C_8$ hydrocarbon solvent, such as pentane, hexane, heptane, etc. The butyl rubber cement thereby formed is halogenated with a halogen gas, e.g. chlorine, whereby halogenated butyl rubber and a hydrogen halide are formed. Halogenated butyl rubber may also be obtained by radical halogenation of butyl rubber using an organic halogenating agent containing the $>$ NX group (where X is halogen), e.g. dichloro hydantion, dibromohydantion and chloro- or bromo succinimide.

The halogenated butyl rubber may contain up to 2 halogen atoms e.g. chlorine or bromine per double bond in the copolymer. In general halogenated butyl rubber contains at least 0.5 wt.% and preferably at least 1.0 wt.% of combined halogen. It usually has a viscosity average molecular weight of between 150,000 and 1,500,000 and a mole unsaturation of between 0.5 and 15%. A typical example of a halogenated butyl rubber is Esso chlorobutyl 10-66, a chlorinated butyl rubber containing about 1.3 wt.% chlorine having about 1.7 mole % unsaturation and a viscosity average molecular weight of about 357,000.

The metal carboxylate can be derived from any alkali or alkaline earth metal. Thus, particularly suitable carboxylates are those of sodium, magnesium and calcium. The carboxylic acid from which the carboxylate is derived can be mono- or poly- carboxylic. Thus, suitable monocarboxylic acids are the $C_4$ to $C_{20}$ monocarboxylic acids such as caproic, caprylic, pelargonic, myristic, palmitic, oleic, stearic and 2-ethyl hexanoic acids. Also suitable is naphthenic acid. The preferred metal carboxylate is calcium stearate.

Although the ether can be a mono-functional ether, e.g. diethyl ether, methyl ethyl ether, anisole and phenetole, it is preferred to use a polyether.

Suitable polyethers are for example diethylene glycol, triethylene glycol and other polyethylene glycols, preferably having a molecular weight of from 100 to 5000, e.g. 200 to 1000. The polypropylene glycols, e.g. dipropylene glycol and tripropylene glycol are also suitable. Other suitable polyethers are polyalkylene glycols terminated by a group or groups other than hydroxyl, e.g. by an alkyl group, e.g. the commercial products Sterox AJ which has the structure $HO(CH_2-CH_2-O)_{9 \text{ to } 10} C_{13}H_{27}$ and MYRJ52 having the structure $CH_3(CH_2)_{16}CO(OCH_2CH_2)_{40}OH$ Also suitable is Arlatone T which is an ethoxylated sorbitol hepta oleate, having 40 ethylene oxide units per mole of sorbitol hepta oleate. This is made by ethoxylating and then esterifying sorbitol.

Ethoxylated sorbitan esters (the TWEEN) series are also very suitable. These are made by dehydrating sorbitol and the dehydrated sorbitol ethoxylated and esterified. Dehydrated sorbitol is a blend of at least 3 isomers one of which is:

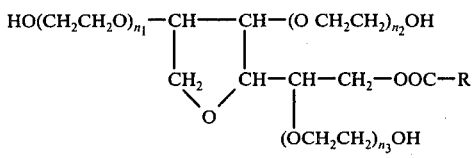

Particular examples are TWEEN 65 -polyoxyethylene (22) sorbitan tristearate where $n_1 + n_2 + n_3 = 22$ and $R$ = tristearate, TWEEN 81 -polyoxyethylene (5) sorbitan monoleate, where $n_1 + n_2 + n_3 = 5$ and $R$ = monoleate and TWEEN 61 - polyoxyethylene (4) sorbitan monostearate where $n_1 + n_2 + n_3 = 4$ and $R$ = monostearate.

Another suitable compound containing ether groups is DER 736 which has the structure

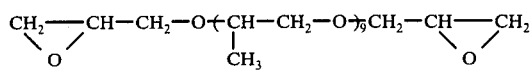

In general, preferred polyethers contain the polyethylene oxide or polypropylene groups, i.e. $(CH_2 - CH_2 - O)_n$ or

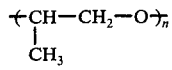

where $n$ is an integer.

The quantity of metal carboxylate and ether incorporated in the composition of the invention can vary but it is preferred that the carboxylate is present at a level of 0.01 to 3.0, especially 0.05 to 0.30, equivalents of metal in the metal carboxylate per gm atom of halogen in the halobutyl rubber. As for the ether it is preferred that 0.01 to 3.0, especially 0.05 to 0.30 equivalents of ether oxygen are present per gm atom of halogen in the halobutyl rubber.

The metal carboxylate and ether may be incorporated in the halobutyl rubber by adding them as a suspension in a hydrocarbon solvent to the halobutyl cement stream either before or during precipitation. They could also be added in undiluted form to the rubber on the drying extractors.

The halobutyl rubber of this invention may be cured by a variety of methods, e.g. by using sulphur, sulphur-containing curing agents (such as sulphenamide derivatives, benzothiazyl disulphide and tetramethyl thiuram disulphide) and zinc oxide.

The curing usually takes place at a temperature of between 140° C and 250° C, preferably 150° to 200° C, and usually takes from 1 to 150 minutes, e.g. 20 to 60 minutes.

Various fillers and extenders can be used and these include various carbon blacks, e.g. SAF, HAF, SRF and EPC, clays, silicas, carbonates, oils, resins and waxes.

EXAMPLE 1

In order to test the effectiveness of the stabilised halobutyl rubber composition of this invention a chlorobutyl rubber was used. The chlorobutyl which was used was one where the original butyl rubber (copolymer of isoprene and isobutylene) had 1.97 mole % unsaturation and a viscosity average MW of 500,000. This had been chlorinated to 1.23 wt.% chlorine (equivalent to about 1 chlorine atom per double bond). The chlorobutyl rubber was heated at 160° C in a Brabender plastograph after adding carboxylate and ether. For comparison purposes this was repeated after adding only carboxylate or only ether.

The following procedure was used in carrying out the test in a 50 cc. Brabender Plastograph. The Brabender was filled at a high rotor speed of 80 r.p.m. In this way the required temperature (dictated by the oil bath temperature) was reached in about 30 seconds. When one then decreased the rotor speed to 30 r.p.m. the temperature in the polymer mass stayed constant. Particular attention was paid to (a) first HCl detection (both by smell and by holding wet pH paper over the mixing chamber) (b) purple colouration (c) start of cross linking visible by increase in Brabender torque. (d) cross-linking was determined by insolubility in hexane (e) chlorine loss was also determined by difference in chlorine level before and after extraction with distilled water of the reacted polymer dissolved in hexane.

From the results given below it can be seen that there is a synergistic effect between calcium stearate and the polyether. The combined systems have a clear advantage in stabilising chlorobutyl over calcium stearate alone; HCl evolution is delayed and there is no discolouring or gel formation.

| Stabiliser | First HCL evolution (minutes) | Purple/gel (minutes) |
|---|---|---|
| calcium stearate 2 wt. % | 13 | 15 |
| calcium stearate (wt. %)* | | |
| + diethylene glycol (0.35 wt. %)* | 20 | No |
| + triethylene glycol (0.25 wt. %)* | 45 | No |
| + sterox AJ (0.2 wt. %)* | 47 | No |
| + MYRJ 52 (0.16 wt.)* | 45 | No |
| MYRJ 52 (0.2 wt. %) | 1 | No |

*All the quantities are equivalent to 0.1 equivalents of ether oxygen per gm atom of chlorine in the chlorobutyl.

EXAMPLE 2

In this example the same chlorobutyl rubber as in Example 1 was used. A comparison was made between chlorobutyl rubber containing: (1) 1.2% by wt. of calcium stearate based on chlorobutyl (2) 1.0% by weight of calcium stearate + 0.10% by wt. (equivalent to 0.05 of ether oxygen per gm atom chlorine) of Sterox AJ, based on chlorobutyl. and (3) 1.0% by weight of calcium stearate + DER 736 (0.09 equivalents of ether oxygen per gm atom chlorine).

The separately stabilised chlorobutyl were heat aged in an oven at 140° C on white iron. It was found that (1) started corrosion and purple colouration after one hour (2) started corrosion after 4 hours, and (3) shows no corrosion after 6 hours.

It is clearly seen that systems (2) and (3) have advantages over system (1).

EXAMPLE 3

A butyl rubber having an unsaturated level of 2.0 mole percent was chlorinated to a level of 1.2 wt.% chlorine on the polymer. This polymer was stabilized by:

(1) 2 phr calcium stearate
(2) 1 phr calcium stearate and 0.57 phr Drapex 10.4 (epoxidized linseed oil)
(3) 1 phr calcium stearate and 0.30 phr TWEEN 61 (an ethoxylated sorbitan mono stearate)

Note: 0.30 phr TWEEN 61 contains the same number of ether oxygen atoms as the number of oxirane atoms in 0.57 phr Drapex 10.4

These polymers were then heated in a Brabender Plastograph at 200° C. The following results were obtained:

(1) Formed purple, cross-linked rubber crumb after 3 feet 30 inches (2) Did not form purple crumb, but the sample gradually darkened and became completely black after 10 minutes heat treatment. The 10 mins sample was partially cross-linked.

(3) Showed an amber color, no purple crumb was formed during the 10 minutes test and the last sample was still completely soluble in hexane indicating the absence of cross-linked polymer.

So, while both Drapex 10.4 and TWEEN 61 prevent the drastic, sudden purple colour formation typical for the case when calcium stearate is used alone, TWEEN 61 appears superior to Drapex 10.4 particularly as far as colour retention is concerned. Moreover, Drapex 10.4 did not prevent formation of some gel, while TWEEN 61 did, in the conditions of the test.

EXAMPLE 4

A commercial, plant finished chlorobutyl sample stabilized with 1.5 phr calcium stearate only and containing excessive amounts of iron contamination (> 40 ppm iron) was blended with small amounts of a polyether Arlatone T (40 Etho sorbitol hepta oleate). Iron is known to be a strong dehydrochlorinating agent of halobutyl.

The samples were put in an air circulating oven at 105° and daily checked for colour and solubility in hexane. The results are represented in the following table.

|  | Heat Stability at 105° C. | | | |
|---|---|---|---|---|
|  | 1 day | 2 days | 3 days | 4 days |
| Original chlorobutyl Sample | insoluble purple | | | |
| + 0.03 phr Arlatone T | | a few gelled particles | insoluble light brown | |
| + 0.045 phr Arlatone T | | soluble clear | soluble clear | soluble clear |
| + 0.06 phr Arlatone T | | soluble clear | soluble clear | soluble clear |

The original sample went purple after about 20 hours heat exposure. 0.03 phr Arlatone T, while showing an important improvement over the base case could not prevent some gel formation. However, 0.045 phr Arlatone T were sufficient to prevent cross-linking and formation of unacceptable colour for at least 4 days heat exposure at 105° C.

To give an idea of the really low amounts of polyether necessary to obtain this improvement in chlorobutyl stability: 0.03 phr Arlatone T contains a number of ether oxygen atoms equivalent to approximately 1 percent of the total number of chlorine atoms in chlorobutyl. (1.5 phr calcium stearate has a number of calcium atoms equivalent to roughly 15 percent of the total number of chlorine atoms).

EXAMPLE 5

Butyl rubber containing 2 mole % unsaturation was brominated with elemental bromine resulting in 1.7 wt.% bromine on the polymer. This brominated butyl was stabilized with 2 phr calcium stearate and a secondary stabilizer as indicated below. The polymers were then heated in an air circulating oven at 177° C with the following results.

| Stabilizer 2 phr CaSt$_2$ | Heat Stability of Brominated Butyl at 177° C | | | | |
|---|---|---|---|---|---|
|  |  | Drapex 10.4 | TWEEN 61 | TWEEN 65 | arlatone |
| Secondary stabilizer | None | 1 phr | 0.9 phr | 0.64 phr. | 0.7 phr. |
| Colour after 10 mins. | red-brown | tan | slightly tan | slightly tan | slightly tan |
| 20 mins. | red-brown | black | tan | tan | tan |
| Percent retained Viscosity Molecular Weight after 10 mins. | gelled | 86 | 95 | 95 | 96 |

The sample without secondary stabilizer underwent dehydrobromination and cross-linked within 10 minutes. The polyethers showed superior stability over the epoxide as indicated by better colour retention and better molecular weight retention.

What is claimed is:

1. A stabilized halobutyl rubber composition comprising a halobutyl rubber, and a stabilizer, the stabilizer consisting essentially of an alkali metal carboxylate or an alkaline earth metal carboxylate at a level of about 0.01 to about 3.0 equivalents of metal in the metal carboxylate per gm atom of halogen in the halobutyl rubber and an ether at a level of about 0.01 to about 3.0 equivalents of ether oxygen per gm atom of halogen in the halobutyl rubber.

2. A composition according to claim 1 wherein the halogenated butyl rubber contains at least 1.0 wt.% of combined halogen.

3. A composition according to claim 1 wherein said metal carboxylate is at a level of about 0.05 to about 0.30 equivalents of metal in the metal carboxylate per gm. atom of halogen in the halobutyl rubber and said ether is at a level of about 0.05 to about 0.30 equivalents of ether oxygen per gm. atom of halogen in the halobutyl rubber.

4. A composition according to claim 1 wherein the halogenated butyl rubber has a mole unsaturation of between 0.5 to 15%.

5. A composition according to claim 4 wherein the halobutyl rubber is chlorobutyl rubber.

6. A composition according to claim 4 wherein the halobutyl rubber is bromobutyl rubber.

7. A composition according to claim 5 wherein the carboxylate is sodium, magnesium or calcium carboxylate.

8. A composition according to claim 5 wherein the carboxylate is a carboxylate of a C$_4$ to C$_{20}$ monocarboxylic acid.

9. A composition according to claim 4 wherein carboxylate is calcium stearate.

10. A composition according to claim 1 wherein the ether is a polyether.

11. A composition according to claim 10 wherein the polyether is a polyalkylene glycol terminated by a group or groups other than hydroxyl.

12. A composition according to claim 10 wherein the polyether is a polyethylene glycol which has a molecular weight of from 100 to 5000.

* * * * *